United States Patent [19]
Bello

[11] Patent Number: 6,041,386
[45] Date of Patent: Mar. 21, 2000

[54] DATA SHARING BETWEEN SYSTEM USING DIFFERENT DATA STORAGE FORMATS

[75] Inventor: Keith Anthony Bello, Tucson, Ariz.

[73] Assignee: International Business Machines Corporation, Armonk, N.Y.

[21] Appl. No.: 09/021,498

[22] Filed: Feb. 10, 1998

[51] Int. Cl.[7] .................................................. G06F 12/00
[52] U.S. Cl. .............................. 711/4; 711/112; 711/202; 395/500
[58] Field of Search ................................ 711/4, 111, 112, 711/202, 147; 395/500; 360/48

[56] References Cited

U.S. PATENT DOCUMENTS

| | | |
|---|---|---|
| 5,255,387 | 10/1993 | Arnold et al. . |
| 5,301,304 | 4/1994 | Menon ..................................... 395/500 |
| 5,506,979 | 4/1996 | Menon . |
| 5,530,819 | 6/1996 | Day, III et al. . |
| 5,535,372 | 7/1996 | Banhase et al. . |
| 5,564,019 | 10/1996 | Beausoleil et al. . |
| 5,581,743 | 12/1996 | Burton et al. . |
| 5,664,144 | 9/1997 | Yanai et al. . |
| 5,724,542 | 3/1998 | Taroda et al. ............................ 395/440 |
| 5,758,125 | 5/1998 | Misinai et al. ........................... 395/500 |
| 5,920,893 | 7/1999 | Nakayama et al. ...................... 711/147 |

*Primary Examiner*—Eddie P. Chan
*Assistant Examiner*—Kevin Verbrugge
*Attorney, Agent, or Firm*—David W. Victor; Konrad, Raynes & Victor LLP

[57] ABSTRACT

Disclosed is a system, typically implemented in a storage controller, for extracting data from a device storing data in a first format, such as the count-key-data (CKD) format. The first format is comprised of a plurality of tracks. Each track has at least one data area and each data area is comprised of at least one addressable block of data. A request from a host system for an address of a block of data in a second data format, such as the Fixed Block Architecture (FBA) format, is received. The system calculates a byte displacement value for the requested address. A data area in a track in the device having a byte displacement value less than the byte displacement value for the requested address is located. A byte location offset is then determined by subtracting the byte displacement value for the located data area from the byte displacement value for the requested address. The system then determines a location in the located data area of a block of data at the byte location offset. The system then provides the host system with the located block of data.

28 Claims, 6 Drawing Sheets

DATA MAP 14
CDK EXTENT LIST 20
BLOCK GROUP LIST 22
DATA CURSOR 24
CKD FILTER 26
CROSS REFERENCE LIST 28

FIG. 3

EXTENT LIST 20
EXTENT 0 - CKD DEVICE "A", TRACKS A THRU B.
EXTENT 1 - CKD DEVICE "A", TRACKS C THRU D.
EXTENT 2 - CKD DEVICE "A", TRACK E.

FIG. 4a

BLOCK GROUP LIST 22
BLOCK GROUP 0 - LUN "F", BLOCKS 100-299
BLOCK GROUP 1 - LUN "F", BLOCKS 400-619

FIG. 4b

| BYTE DISPLACEMENT | EXTENT | TRACK | RECORD |
|---|---|---|---|
| 0 | EXTENT 0 | TRACK A | RECORD 1 |
| 5,120 | EXTENT 0 | TRACK A | RECORD 2 |
| 10,240 | EXTENT 0 | TRACK A | RECORD 3 |
| 15,360 | EXTENT 0 | TRACK B | RECORD 1 |
| 20,480 | EXTENT 0 | TRACK B | RECORD 2 |
| 25,600 | EXTENT 0 | TRACK B | RECORD 3 |
| 30,720 | EXTENT 1 | TRACK C | RECORD 1 |
| 35,840 | EXTENT 1 | TRACK C | RECORD 2 |
| 40,960 | EXTENT 1 | TRACK C | RECORD 3 |
| 46,080 | EXTENT 2 | TRACK D | RECORD 1 |
| 51,200 | EXTENT 2 | TRACK D | RECORD 2 |
| 56,320 | EXTENT 2 | TRACK D | RECORD 3 |
| 61,440 | EXTENT 2 | TRACK E | RECORD 1 |
| 66,560 | EXTENT 2 | TRACK E | RECORD 2 |
| 71,680 | EXTENT 2 | TRACK E | RECORD 3 |

DATA SHARING BETWEEN SYSTEM USING DIFFERENT DATA STORAGE FORMATS

FIELD OF THE INVENTION

The present invention relates to a method for mapping a data set maintained in a storage device in a first format, such as the count-key-data (CKD) format, to a data set maintained in a second format, such as the fixed block address (FBA) format.

BACKGROUND OF THE INVENTION

Data stored in a direct access storage device (DASD) may be arranged in a fixed block architecture (FBA) format or a count-key-data (CKD) format. The FBA format involves the storage of data in blocks of fixed size. These blocks are addressed by a block number relative to the beginning of the file. An FBA block is referred to as a sector, which is addressable by the host. The CKD format is a DASD data-recording format employing self-defining record formats in which each record is represented by a count area that identifies the record and specifies its format, an optional key area that may be used to identify the data area contents, and a data area that contains the user data for the record. The CKD format provides for variable format data records. In the prior art, it is commonly found that open systems hosts access data in a DASD using the FBA format and ESCON and mainframe hosts access data in the CKD format.

FIG. 1 illustrates a prior art structure for a single CKD track in a CKD device. An index point (IP) is a starting point, followed by a gap (G), which indicates a break between the fields. A home address (HA) follows the first gap (G) and identifies the location of the track in the DASD and its operational status. Following the home address (HA) are the records, $R_0$ through $R_n$. Record zero ($R_0$) contains either system or user data. Each following record, $R_1$ through $R_n$, includes a count area that identifies the record and defines the lengths of the key and data areas. The key area of each record is optional and may be used by the programmer to identify the information in the data area record. The data area contains data. The number of records (R) that can be placed on a track depends on the length of the data areas of the records, whether the records contain a key area, and the size of the gaps. Records may be of equal or unequal lengths.

With FBA devices, the data may be directly addressed without the storage controller having to search the physical DASD device to locate the record. CKD devices, on the other hand, include data descriptors, e.g., the count and key areas, which the storage controller must bypass and interpret to locate the data areas of the records. Because of the fixed length of data sectors, FBA devices have higher capacity and better performance than CKD formatted devices. Notwithstanding, many mainframe and ESCON devices utilize the CKD format because CKD permits data records to be recorded as units of contiguous signals. Whereas, with FBA, data must be dissected and distributed into a group of fixed block-size sectors. Moreover, since the introduction of the IBM System/360 in 1964, nearly all IBM large and intermediate DASD devices employ the CKD data format.

The prior art discloses systems for emulating the CKD format on FBA devices and for converting CKD formatted records to the FBA format. Such systems are disclosed and discussed in U.S. Pat. No. 5,535,372 to Michael T. Benhase et al., which is assigned to IBM, the assignee of the present application, and is incorporated herein by reference in its entirety. Still further, data in the CKD format is typically written and imposed onto the fixed blocks of a FBA device, as discussed in U.S. Pat. Nos. 5,535,372 and 5,664,144. In such case, the data area of a CKD record can span multiple fixed blocks or sectors in the FBA device. U.S. Pat. No. 5,664,144 to Moshe Yanai et al. is assigned to EMC corporation, and is incorporated herein by reference in its entirety.

An open systems host views the DASD as a series of logical units (LUNs) comprised of fixed blocks of data. A storage controller presents linear addressable arrays of fixed blocks of data to the open systems host 4. A controller would provide a CKD host, such as an ESCON host, with views of the data areas in the CKD volumes of the DASD. However, an open systems host cannot directly read linear arrays of fixed blocks in a CKD device because many of the fixed blocks would contain data location information, e.g., the header address, count area, and key area, which is unintelligible to the open systems host.

SUMMARY OF THE INVENTION

To address the shortcomings in the prior art, preferred embodiments of the present invention provide a system for extracting data from a device storing data in a first format. The first format is comprised of a plurality of tracks. Each track has at least one data area and each data area is comprised of at least one addressable block of data. A request from a host system for an address of a block of data in a second data format is received. The system calculates a byte displacement value for the requested address. A data area in a track in the device having a byte displacement value less than the byte displacement value for the requested address is located. A byte location offset is then determined by subtracting the byte displacement value for the located data area from the byte displacement value for the requested address. The system then determines a location in the located data area of a block of data at the byte location offset. The system then provides the host system with the located block of data.

In further embodiments, an index is used to locate the data area in the track which includes the byte location offset. The index is scanned to identify a greatest byte displacement value in the index that is less than or equal to the byte displacement value for the requested fixed block address. A data area in a track is associated with each byte displacement value in the index. The located data area is in the track associated with the byte displacement value identified in the index. Further, the step of determining the byte location offset is determined by subtracting the identified byte displacement value in the index from the displacement value for the requested address.

It is an object of the present invention to map a fixed block address requested by an open systems host to a location in a data area in a CKD track in a CKD device, such that the data in the located data area could be provided to the open systems host.

It is a further object of the present invention to provide an index which associates byte displacement values with data areas in the CKD tracks which can be used to map a requested fixed block address to a data area in a CKD track.

It is still a further object of the present invention that a CKD device can share its data with an open systems host.

BRIEF DESCRIPTION OF THE DRAWINGS

Referring now to the drawings in which like reference numbers represent corresponding parts throughout:

FIG. 3 is an example of a data map and fields therein used by a storage controller to map a fixed block address to a data area in a CKD device;

FIG. 4a is an example of an extent list providing an arrangement of addressable CKD tracks;

FIG. 4b is an example of a block group list providing ranges of fixed block addresses;

FIG. 6 is an example of a byte displacement index in accordance with preferred embodiments of the present invention;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 2:
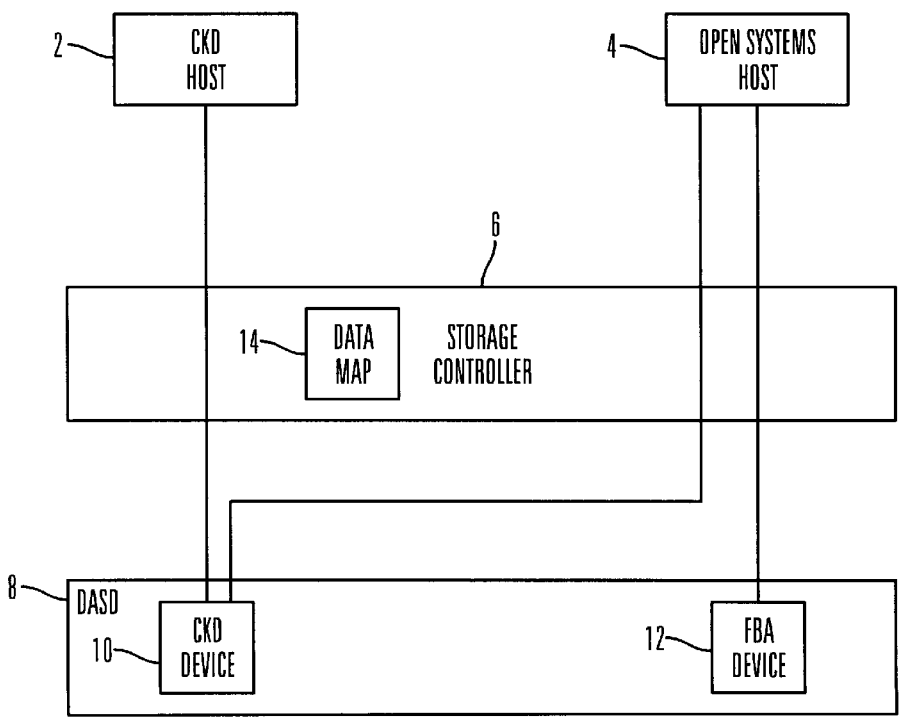
FIG. 2 is a block diagram illustrating an exemplary hardware environment used to implement a preferred embodiment of the invention.

FIG. 2 illustrates a hardware environment in which the preferred embodiments of the present invention are embedded. A CKD host 2 is a computer, such as an IBM mainframe or ESCON host which reads and writes data in the CKD format. An open systems host 4 is a computer, such as a personal computer, workstation, etc., which reads and writes data in the FBA format. A storage controller 6 interfaces and controls input/output operations between the CKD host 2 and the open systems host 4 and a direct access storage device (DASD) 8. The storage controller 6 may be any suitable storage controller which can interface between a DASD and host computers, providing access to FBA and CKD formatted data, such as the IBM 3990 DASD controller. The DASD 8 may be comprised of hard disk drives, a tape cartridge library, optical disks or any other suitable large, non-volatile storage medium known in the art. In preferred embodiments, the DASD 8 is comprised of one or more magnetic hard disk drives. The DASD 8 is arranged as two devices, one CKD device 10 and another FBA device 12. In preferred embodiments, the DASD 8 is an FBA device and the CKD device 10 therein is formed by mapping CKD tracks onto the fixed addressable blocks in the DASD 8. The CKD host 2 directly reads and writes to the CKD device 10 and the open systems host 4 directly reads and writes to the FBA device 12.

Figure 1:
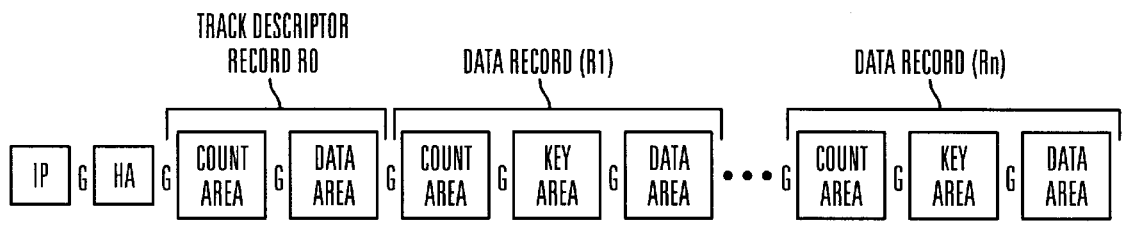
FIG. 1 illustrates a data structure for a CKD track.

The CKD device 10 is comprised of tracks. A track is the smallest directly addressable space in the CKD device 10. The starting point of each track is the index point (IP), as shown in FIG. 1. Tracks are grouped into sets called cylinders. As discussed, the first area of the CKD track is the home address (HA) which identifies the track and indicates its status. Data records following Record Zero ($R_0$) contain the data areas. In present systems, the data area in the records following $R_0$ can be from 1 to 65,535 bytes. CKD records imposed on an FBA device may span multiple FBA block group boundaries. Further, individual FBA blocks may contain multiple CKD records. When accessing a CKD track, the storage controller can determine where data areas are located by detecting the index point and count area which instructs the storage controller as to the arrangement of the count, key, and data areas in the CKD track. Once a count area or index area is detected, the storage controller 6 can work its way down the track, always being aware of the type of area passing under the hard disk read/write mechanism.

To access the tracks in the CKD device 10, the storage controller 6 accesses an extent list. An extent list is a set of consecutively addressed tracks in the CKD device 10 that the storage controller 6 may access. An extent is defined by specifying the addresses of the first and last tracks in the extent. If the last extent address is greater than the first extent address, then a multi-track extent is defined. In such case, the extent crosses track and, perhaps, cylinder boundaries. Although the extent list defines consecutive tracks of data, the extents themselves may be arbitrarily located throughout the physical space of the CKD device 10. Thus, the extents may be dispersed throughout the CKD device 10, but the tracks within any extent are located consecutively on the physical space. The extent list further includes additional parameters which instruct the storage controller 6 about the accessible tracks in the CKD device 10. The format and commands used to define CKD data and extent lists is described in "Introduction to Nonsynchronous DAS Subsystems" (IBM Document No. GC26-4519-00, copyright International Business Machines, 1990) and "IBM 3990 Storage Control Reference" (IBM Document No. GA32-0099-06, copyright International Business Machines, 1994), which are incorporated herein by reference in their entirety.

The storage controller 6 includes a data map 14. The storage controller 6 accesses the data map 14 when the open systems host 4 requests an input/output operation on a FBA address that is defined as being located in the CKD device 10 of the DASD 8. The term sector as used herein refers to a fixed block address in the FBA format. The data map 14 includes information which the storage controller 6 uses to map a sector requested from the open systems host 4 to data areas in the CKD tracks, and vice-versa. Without such mapping provided by the data map 14, the storage controller 6 would provide the open systems host 4 with the non-data portions of the CKD tracks, such as data in the key, count, home address, and index point fields shown in FIG. 1. Such CKD data is unintelligible to the open systems host 4.

FIG. 3 shows a preferred embodiment of the data map 14 including five components, a CKD extent list 20, a block group list 22, a data cursor 24, a CKD filter 26, and a byte displacement index 28. The CKD extent list 20 provides a list of extents, including the addressable CKD tracks in the CKD device 10. FIG. 4a provides an example of an extent list 20, including three extents, extents 0, 1, and 2. Device "A" is the address of the physical CKD device 10 addressed by the CKD host 2 which includes the CKD tracks. For example, the CKD host 2 would identify and address CKD device 10 as Device "A".

In the exemplar extent list 20 of FIG. 4a, extent 0 provides the addresses for tracks A and B, extent 1 provides the address of tracks C and D, and extent 2 includes the address of track E. In preferred embodiments, the storage controller 6 writes data sequentially to the data records in a CKD track until the track fills up, then proceeds to the next track in the extent. When the CKD host 2, such as an ESCON host or IBM mainframe, determines that additional extents are needed, the CKD host 2 or the open systems host 4 may issue commands to the storage controller 6 to add extents to the data set and subsequently update the storage controller's 6 extent list 20 with information on the added extents. Thus, the tracks within an extent are physically located consecutively within the CKD device 10. However, tracks between extents do not have to be in contiguous physical locations, and may be physically dispersed throughout the CKD device 10. In this way, the extent list 20 provides the storage controller 6 with the CKD arrangement of the CKD device 10, otherwise identifiable by the CKD host 2 as Device "A." Those skilled in the art will appreciate that the extent may define tracks and records in a different arrangement.

The block group list 22 provides the storage controller 6 with fixed block addresses of data that physically resides in CKD data tracks. If the open systems host 4 attempts to access information from an address listed in the block group list 22, the storage controller 6 would use information in the data map 14 to locate data in the CKD device 10 which corresponds to the address listed in the block group list 22 the open system requested. In preferred embodiments, when CKD tracks and data records are added to the CKD device 10, further fixed block addresses may be set aside in the block group list 22 to map to the newly added CKD tracks.

In the preferred embodiment, the fixed blocks are each 512 bytes. The fixed blocks are organized into block groups which comprise a range of addressable blocks of equal size. Block groups are arranged into logical units numbers (LUNs). LUNs appear to the open systems host 4 as a single physical disk. In certain configurations, the groups of fixed blocks which comprise a LUN could be physically dispersed through the storage area in the FBA device 12. In preferred embodiments, the byte length of the CKD records and data areas therein are uniform and multiples of the FBA block size. However, in alternative embodiments, the CKD records may have varying size and the data area of the CKD records may not be a multiple of the FBA block size.

The data cursor 24 provides information on the location of the end of the actual or usable CKD records within the addressable portions of the CKD device 10 described in the data map 14. In preferred embodiments, the data cursor 24 contains the byte displacement of the last fixed block which includes CKD data. No data is available beyond the byte displacement identified in the data cursor 24. As the CKD host 2 writes data to the CKD device 10 of the DASD 8, the byte displacement value in the data cursor 24 is incremented to reflect that new CKD records have been added. Further, as CKD records are added, groups of FBA addresses could be added to the block group list 22 indicating additional FBA addresses corresponding to locations in the CKD device 10.

The CKD filter 26 provides information on the type of fields included in the CKD data records, i.e., whether there are count and key areas, the length of the count, key, and data areas, etc. The storage controller 6 uses the CKD filter 26 information to locate the data areas within the CKD tracks. In preferred embodiments, the CKD tracks would only include data areas and not the count areas and key areas discussed above. If the data areas and data records are of uniform size, then the count area is not needed to define the length of the data and key areas. In such case, information on uniform length data areas could be provided in the CKD filter 26.

The byte displacement index 28, shown in FIG. 6, provides the fixed block byte displacement of requested data. When the open systems host 4 requests a sector in LUN "F", the storage controller 6 can calculate the byte displacement of the requested sector by examining the block group list 22 to determine the byte displacement of the requested sector within the block group list 22. The byte displacement index 28 lists the byte displacement value for a given record, track, and extent in the CKD device 10. The storage controller 6 utilizes the information in the byte displacement index 28 and the data map 14 to extract data from the CKD device 10 which corresponds to the byte displacement of the requested address within the block group list 22.

Building and Using the Data Map

Figure 5:
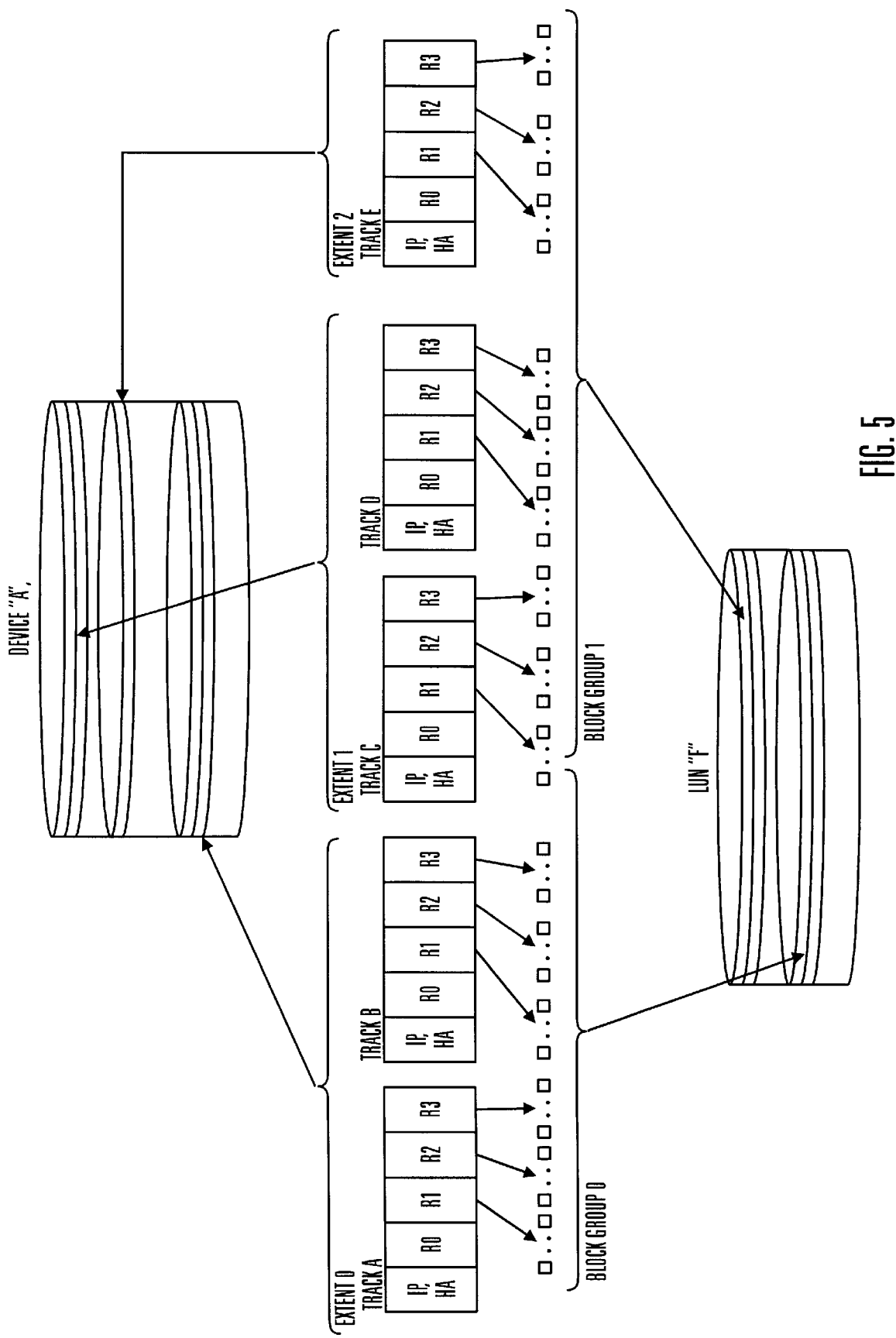
FIG. 5 illustrates how the data in the CKD tracks relates to fixed blocks in the FBA format.

FIG. 5 illustrates an exemplary arrangement of the CKD tracks in the extent list 20 described in FIG. 4a. In this example, the CKD data records only include data areas. Data record zero ($R_0$) does not contain data transferred to the host. Each CKD track has three data records, $R_1$, $R_2$, $R_3$, wherein each data record has a uniform length data area of 5,120 bytes. As discussed, in preferred embodiments, the data area and data record would be comprised of a length which is a multiple of the length of each fixed block, which in preferred embodiments is 512 bytes. Hence, the data area of each data record in this example is 5,120 bytes and is comprised of 10 individually addressable fixed blocks, each having a length of 512 bytes. Thus, the data areas of all the tracks A–E comprise 76,800 bytes. In such case, the data cursor 24 would indicate that the last byte including data is byte 76,800. If the open systems host 4 requests a block in the block group list 22 that maps to a byte location in the CKD device 10 after the $76,800^{th}$ byte, then the storage controller 6 would recognize that the open systems host 4 has attempted to access a location not yet created and provide an appropriate response.

FIG. 5 further illustrates how the CKD tracks A–E map to physical locations on a Device "A". The blocks below the track records represent blocks of data extracted from the CKD tracks A–E which map to locations on LUN "F". The block group list 22 is the address of those blocks extracted from the CKD tracks A–E. The storage controller 6 receives a request from the open system host 4 for an address listed in the block group list 22. The storage controller 6 utilizes the data map 14, including the byte displacement index 28, to extract data from the CKD tracks A–E corresponding to the requested fixed block address listed in the block group list 22.

FIG. 6 provides a byte displacement index 28 for the extents 0, 1, and 2 shown in FIG. 5. For each byte displacement index 28 entry in FIG. 6, there is a CKD record which begins at that byte displacement. Thus, each byte displacement index 28 entry provides the byte displacement and the extent, track, and record which begins at such byte displacement. In the preferred embodiment, the records do not have count and key areas, and have data areas of uniform length (5,120). Further, each track has an equal number of records. Thus, in this preferred embodiment, after the extent list is defined, the storage controller 6 can automatically define the byte displacement index 28 because the number of records in each track and byte displacements thereof is predetermined.

In alternative embodiments, when the records are of variable length and count and key areas are included in the CKD tracks, the storage controller 6 must physically scan the CKD tracks, records, and data areas therein to determine the byte lengths of the data areas which are then used to determine the byte displacement of the data areas. In further embodiments, the count area can define the length of the data area. In such case, the storage controller would physically read the count areas to determine the byte lengths of the data areas, and use this information to calculate the byte displacement index 28 values for the data areas.

Figure 7A:
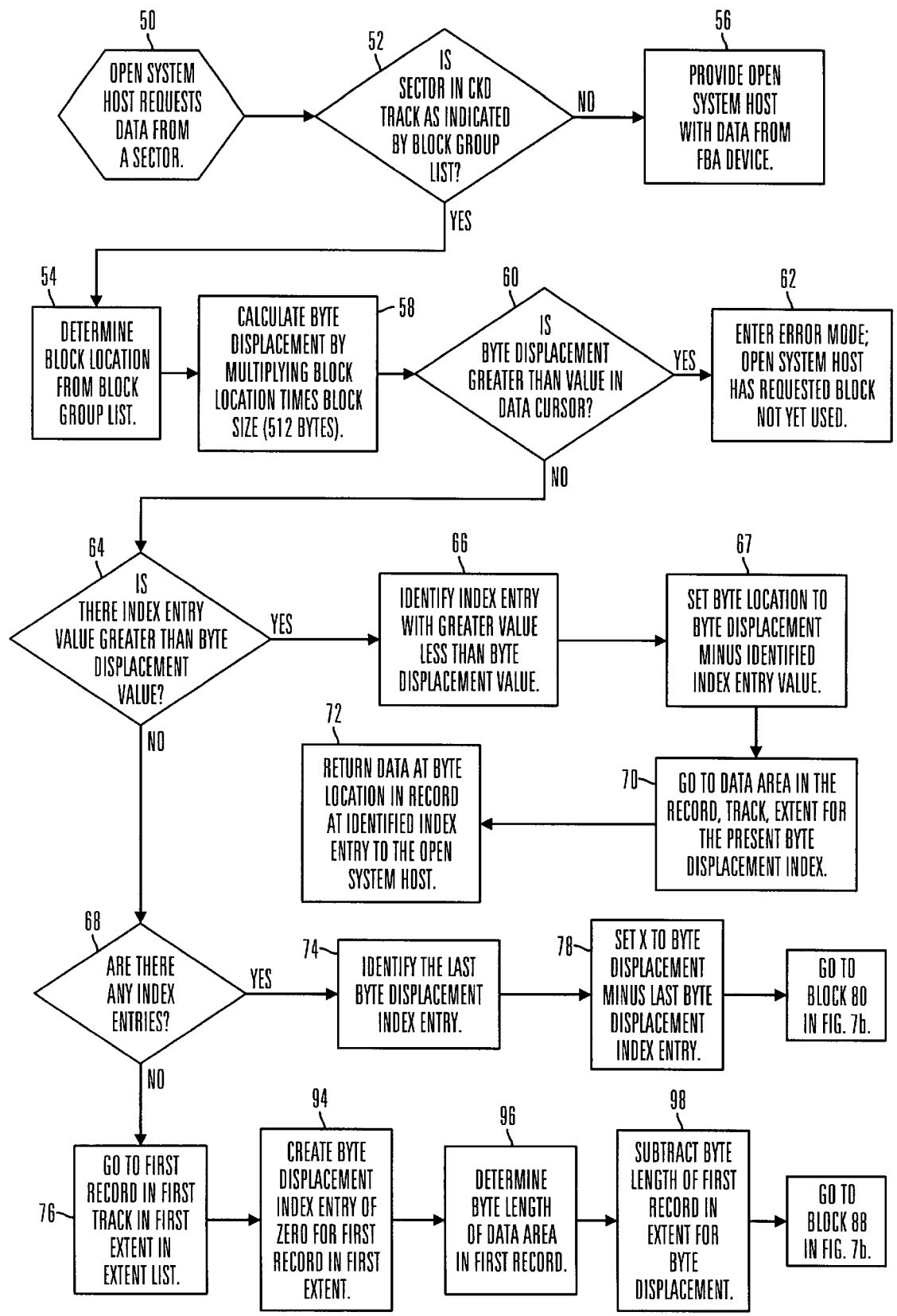
FIGS. 7a and 7b are flowcharts that illustrate logic to map a fixed block address to a data area in a CKD track and create entries in a byte displacement index which are used to map a fixed block address to a data area in a CKD track.
Figure 7B:
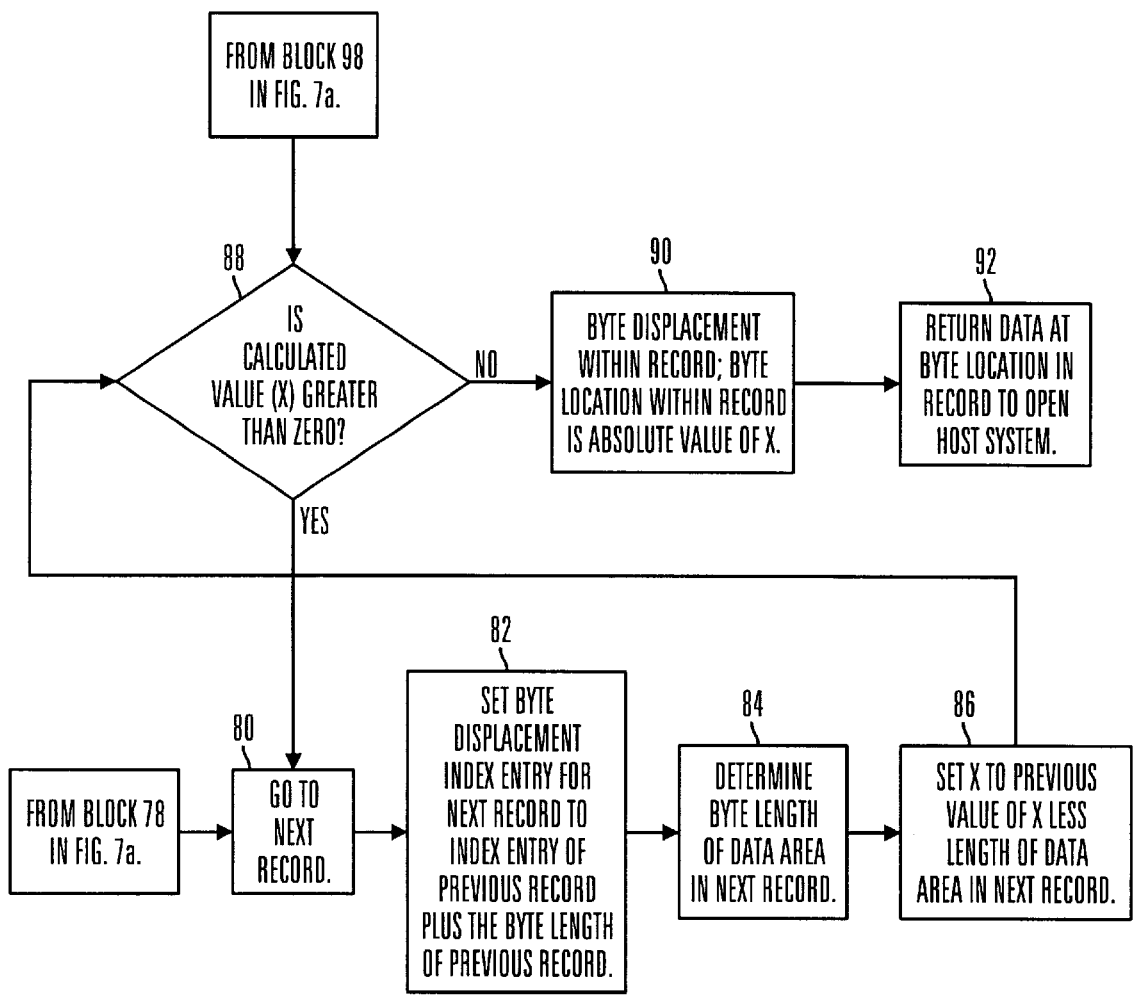

FIGS. 7a and 7b are flowcharts illustrating the logic used by the storage controller 6 to generate index entries and to extract data from CKD data records to present to the open systems host 4. Such logic may be implemented in DASD channel programs processed by the host operating system to generate commands to control the storage controller 6, in the firmware of the storage controller 6, as hardware logic (e.g., circuits and gates) or some combination thereof. Those skilled in the art will recognize that this logic is provided for illustrative purposes only and that different logic may be used to accomplish the same results. The logic in FIGS. 7a, b is used when all the index entries in the byte displacement index 28 are available and when the byte displacement index 28 is incomplete. In this way, with the logic of FIGS. 7a, b, the storage controller 6 can generate the byte displacement index entries while mapping a sector requested by the open systems host 4 to a data area within the CKD device 10.

At block 50, the open systems host 4 requests to access a sector in the DASD 8. Control transfers to block 52 which represents the storage controller 6 determining whether the requested sector is within the CKD device 10 of the DASD 8, as opposed to the FBA device 12. In preferred embodiments, the storage controller 6 determines whether the requested sector is in a CKD track by checking whether the requested sector is listed in the block group list 22. If the requested sector is in CKD tracks, then control transfers to block 54; otherwise, control transfers to block 56.

If the open systems host 4 request was for a sector in the FBA device 12, then control transfers to block 56 which represents the storage controller 6 providing the open systems host system 4 access to the requested fixed block sector in the FBA device 12. If the requested sector is in the CKD device 10, then the storage controller 6 must extract data from the CKD tracks in the CKD device 10 using the data map 14. At block 54, the storage controller 6 determines the block displacement value of the requested sector in the block group list 22. For instance, if the open systems host 4 requested sector 225 in LUN "F", the storage controller 6 would check the block group list 22 shown in FIG. 4b and note that the requested sector is the 125$^{th}$ block in block group 0. If the open systems host 4 had requested sector 450 in LUN "F", then the storage controller 6 would determine upon checking block group list 22 in FIG. 4b that the requested sector is the 50$^{th}$ block in block group 1, which is the 250$^{th}$ block in data map 14, i.e., 200 blocks are in block group 0 plus (450 minus 400), which is the block displacement of sector 450 in block group 1. Control transfers to block 58 which represents the storage controller 6 calculating the byte displacement for the requested sector by multiplying the block location times 512, which is the byte size of each block. Thus, the byte displacement for sector 225 in LUN "F" is 125 (the block location) times 512, which equals 64,000. The byte displacement for sector 450 in LUN "F" is 250 (the block displacement into the data map 14) times 512, which equals 128,000.

Upon determining the byte displacement of the requested sector from the block group list 22, control transfers to block 60 which is a decision block representing the storage controller 6 determining whether the byte displacement is greater than the value in the data cursor 24. If so, control transfers to block 62; otherwise, control transfers to block 64. As discussed, the data cursor 24 stores the byte displacement of all data written to data areas within the CKD tracks. In preferred embodiments, the storage controller 6 would keep track of the byte displacement for all created CKD data records. There are no data areas following the byte displacement value in the data cursor 24. If the open systems host 4 requested a sector that is mapped to a CKD record not yet created, then control transfers to block 62 which represents the storage controller 6 entering an error mode. In this error mode, the storage controller 6 could provide an error message to the open systems host 4, wait until the requested sector is created before completing the open systems host 4 request or, if the open systems host 4 requested a group of sectors, proceed to provide the open systems host 4 with all requested sectors that map to existing CKD data areas.

If the open systems host 4 requested a sector whose byte displacement is within existing CKD records as indicated by the data cursor 24, then control transfers to block 64 which represents the storage controller 6 examining the byte displacement index 28 and determining whether there is an index entry value greater than the byte displacement value for the requested sector. If so, control transfers to block 66; otherwise, control transfers to block 68. Block 66 represents the storage controller 6 identifying the byte displacement index 28 entry with the greatest value less than the byte displacement value. In the case where the requested sector is 225 and the calculated byte displacement is 64,000, the storage controller 6 would refer to the byte displacement index 28 shown in FIG. 6 and locate the next to last index entry 30 of 61,440, which is the greatest index entry value less than 64,000.

Control then transfers to block 67 which represents the storage controller 6 setting the byte location within the data area to the calculated byte displacement for the requested sector minus the identified index entry. The byte location for the byte displacement of 64,000 is 2,560 (64,000−61,440). This calculated byte location is the byte location in the data area of the record associated with the identified index entry. At block 70, the storage controller 6 directs the disk drive head to the data area in the record listed for the identified byte displacement index 28 entry. The byte displacement index 28 entry provides extent, track, and record location information for the storage controller 6 to use to locate the record and data area therein for the byte displacement. The record listed for the identified index entry of 61,440 in FIG. 6 is located in Extent 2, Track E, Record 1. Control then transfers to block 72 which represents the storage controller 6 moving the disk drive read/write head over to the byte location offset in this data area, and then extracting the block of data at this byte location offset from the CKD track. This extracted data is presented to the open systems host 4 as the data located at the fixed block address in the block group list 22 the open systems host requested. As discussed, in the preferred embodiments, the data area is comprised of multiple FBA fixed blocks. Thus, the byte location offset defines the location of a fixed block of data within the data area of a CKD record. The sector 225 requested by the open systems host 4 maps to the 2,560$^{th}$ byte location within Extent 2, Track E, Record 1.

If, at block 64, the storage controller 6 determined that there was no byte displacement index 28 entry value greater than the calculated byte displacement of the sector, then this may indicate that the byte displacement index 28 is incomplete. If so, control proceeds to block 68 which is a decision block representing the storage controller 6 determining whether there are any byte displacement index 28 entries. If there are some entries in the byte displacement index 28, then control transfers to block 74; otherwise, control transfers to block 76. Block 74 represents the storage controller 6 identifying the value for the last byte displacement index 28 entry provided. For instance, in FIG. 6, the last index entry could be index entry 32, which lists Extent 1, Track C, and Record 3. In such case, the byte displacement index entries shown in FIG. 6 following index entry 32 would not exist. Control transfers to block 78 which represents the storage controller 6 calculating a value, which is stored at pointer X in the storage controller 6, by subtracting the last byte displacement index entry from the calculated byte displacement value for the requested sector. For instance, if the last byte displacement index entry 32 in FIG. 6 was 40,960, then in the case where the byte displacement is 64,000 (requested sector of 225), X would be set to 23,400 (64,000–40,960). Control then proceeds to block 80 et al. in FIG. 7b to fill-up the byte displacement index entries and map the requested sector.

In FIG. 7b, block 80 represents the storage controller 6 locating the next record in the CKD device 10. In the case where the last index entry 32 is 40,960, the next record would be listed at index entry 34 in FIG. 6, i.e., Extent 2, Track D, Record 1. The storage controller 6 may have to skip into the following track or the following extent to locate the next sequential CKD record. Control then transfers to block 82 which represents the storage controller 6 setting the byte displacement index entry for the next record to the value of the index entry of the previous record plus the byte length of the previous record. In the case of FIG. 6 where the previous index entry 32 was 40,960, the storage controller 6 would set the index entry 34 to 46,080, which is calculated by adding 5,120, which is the byte length of the data area in the previous data record (Record 3, Track C, Extent 1), to the index entry 32 for the previous record. In preferred embodiments, the storage controller 6 would include a buffer to keep track of the byte length of the data area of a record as it is moving the disk drive head from one record to another.

After updating the next entry in the byte displacement index 28, control proceeds to block 84 which represents the storage controller 6 determining the byte length of the data area in the next record. The storage controller 6 may know the byte length of each data area if such length is uniform and predetermined throughout all records in the CKD tracks. Alternatively, the storage controller 6 may determine this byte length by moving the disk head through the data area in the next record. In embodiments where the CKD records include a count area, the count area would provide information on the byte length of the data area in the data record. After determining the byte length of the next record, control proceeds to block 86 which represents the storage controller 6 setting X to the previous value of X less the length of the data area determined at block 84. Control then proceeds to block 88 which represents the storage controller 6 determining whether this calculated value X is greater than zero. If so, then this next record does not include the byte location mapping to the sector requested by the open systems host 4 and control transfers back to block 80 to check the next record and create the next byte displacement index 28 entry. Otherwise, if the byte displacement for the requested sector is within this next record, then control transfers to block 90. At block 90, the byte location offset is the absolute value of X. Control then proceeds to block 92, which represents the storage controller 6 moving the disk head to the byte location offset within this next record. The storage controller 6 extracts the data in the block beginning at this byte location in the CKD track and presents the extracted data to the open systems host 4 as the block at the requested address from the block group list 22.

If, at block 68, the storage controller 6 had determined that there were no entries in the byte displacement index 28, then control would proceed to block 76 which represents the storage controller locating the first record, in the first track, in the first extent. Control then transfers to block 94 which represents the storage controller 6 creating a byte displacement index 28 entry of zero for the first CKD record. Control then proceeds to block 96 which represents the storage controller 6 determining the byte length of the first record. Control transfers to block 98 which represents the storage controller 6 subtracting the byte length of the first record from the byte displacement of the requested sector calculated at block 58. From block 98, control transfers to block 88 to update the entries in the byte displacement index 28 and map the requested sector to a CKD data area.

The above algorithm in FIGS. 7a, b could also be used to map a range of sectors requested by an open systems host 4. In such case, the storage controller 6 could determine the CKD track mapping of the first sector, and then provide the open system host 4 blocks from the data areas beginning at the mapping of the first sector in the CKD device 10 up until when the mapped data area of the last requested sector in the range of requested sectors is reached.

Conclusion

This concludes the description of the preferred embodiments of the invention. The following describes some alternative embodiments for accomplishing the present invention.

Preferred embodiments have been described with respect to a CKD device formed over a fixed block DASD, wherein the length of the records and data areas have a byte length which is a multiple of the fixed blocks. In alternative embodiments, the data areas and CKD records may have varying lengths which may not be a multiple of the byte length of the fixed blocks. In yet further embodiments, the CKD devices may not be imposed on a fixed block FBA device.

Moreover, events may occur at times different than the times described above. For instance, the entries in the byte displacement index may be generated before mapping occurs by having the storage controller scan the CKD device and determine the byte lengths of the data areas in the CKD tracks. Alternatively, if the CKD tracks have the same number of data records and each data record has a uniform byte length, then the storage controller can generate the byte displacement index entries without having to physically scan the CKD device.

In the preferred embodiments, the storage controller is described as performing most of the mapping and byte displacement index operations. In alternative embodiments, operations described with respect to the storage controller may be implemented in logic in channel programs that are executed in the operating system of the host system to generate commands to control the storage controller. Such channel programs can be implemented using CKD or Extended CKD (ECKD) commands described in the IBM publications incorporated herein by reference.

In summary, preferred embodiments disclose a system for extracting data from a device storing data in a first format. The first format is comprised of a plurality of tracks. Each track has at least one data area and each data area is comprised of at least one addressable block of data. A request from a host system for an address of a block of data in a second data format is received. The system calculates a byte displacement value for the requested address. A data area in a track in the device having a byte displacement value less than the byte displacement value for the requested address is located. A byte location offset is then determined by subtracting the byte displacement value for the located data area from the byte displacement value for the requested address. The system then determines a location in the located data area of a block of data at the byte location offset. The system then provides the host system with the located block of data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for extracting data from a device storing data in a first format, wherein the first format is comprised of a plurality of tracks, wherein each track has at least one data area, and wherein each data area is comprised of at least one addressable block of data, comprising the steps of:

(a) receiving a request from a host system for an address of a block of data in a second data format;

(b) determining a byte displacement value for the requested address;

(c) locating a data area in a track in the device having a byte displacement value less than the byte displacement value for the requested address;

(d) determining a byte location offset by subtracting the byte displacement value for the located data area from the byte displacement value for the requested address;

(e) determining a location in the located data area of a block of data at the byte location offset; and (f) providing the host system with the located block of data.

2. The method of claim 1, further comprising the step of initiating the extracting operation upon determining that the address requested by the host system is included in a block group list comprised of ranges of addresses of blocks of data in the first format.

3. The method of claim 2, wherein the step of determining the byte displacement value for the requested address further comprises the steps of:

determining a block location of the requested block address from the block group list; and calculating the byte displacement value by multiplying the block location times a byte length of each block in the first format.

4. The method of claim 1, further comprising the steps of:

identifying a greatest byte displacement value in an index that is less than or equal to the byte displacement value for the requested address, wherein a data area in a track is associated with each byte displacement value in the index, and wherein the located data area in the track is the data area associated with the byte displacement value identified in the index; and wherein the step of determining the byte location offset is determined by subtracting the byte displacement value identified in the index from the displacement value for the requested address.

5. The method of claim 4, wherein a byte displacement value in the index for a given data area is determined by adding the byte displacement value in the index for the previous data area to the byte length of the given data area.

6. The method of claim 5, wherein each track has an equal number of data areas and wherein each data area is comprised of an equal number of fixed blocks, and wherein the byte displacement values in the index are calculated without physically accessing the device to determine the byte lengths of the data areas.

7. The method of claim 1, wherein the step of locating the data area in the track further includes the steps of accessing an extent list comprised of multiple extents, wherein each extent includes one or more tracks, wherein the extents define an order of tracks and the data areas therein, and wherein the byte displacement value of a data area in a track is a total of all bytes in data areas in tracks prior in the order.

8. The method of claim 1, wherein the step of locating the data area in the track further includes the step of accessing a filter which identifies the structure of the tracks.

9. The method of claim 1, further including the steps of:

determining whether the byte displacement value for the requested address is greater than a value in a data cursor, wherein the data cursor value indicates the byte displacement for all data areas in the device; and indicating that the requested address is at a location in the device which does not include data upon determining that the byte displacement value for the requested address is greater than the data cursor value.

10. An apparatus for extracting data from a device storing data in a first format, wherein the first format is comprised of a plurality of tracks, wherein each track has at least one data area, and wherein each data area is comprised of at least one addressable block of data, comprising:

(a) logic for receiving a request for an address of a block of data in a second format;

(b) logic for determining a byte displacement value for the requested address;

(c) logic for locating a data area in a track in the device having a byte displacement value less than the byte displacement value for the requested address;

(d) logic for determining a byte location offset by subtracting the byte displacement value for the located data area from the byte displacement value for the requested address;

(e) logic for determining a location in the located data area of a block of data at the byte location offset; and (f) logic for providing the host system with the located block of data.

11. The apparatus of claim 10, further comprising:

a memory storing a block group list comprised of ranges of block addresses; and logic for initiating the extracting operation upon determining that the address requested by the host system is included in the block group list.

12. The apparatus of claim 10, wherein the logic for determining the byte displacement value for the requested block address further comprises:

logic for determining a block location of the requested block address from the block group list; and logic for calculating the byte displacement by multiplying the block location times a byte length of each block in the first format.

13. The apparatus of claim 10, further comprising:

a memory storing a byte displacement index, wherein the index associates a byte displacement value with data areas in the device;

logic for identifying a greatest byte displacement value in the index that is less than or equal to the byte displacement value for the requested address, wherein the located data area in the track is the data area associated with the byte displacement value identified in the index; and wherein the logic for determining the byte location offset calculates the byte location offset by subtracting the byte displacement value identified in the index from the displacement value for the requested address.

14. The apparatus of claim 13, further including logic for determining a byte displacement value in the index for a given data area by adding the byte displacement value in the index for the previous data area to the byte length of the given data area.

15. The apparatus of claim 14, wherein each track has an equal number of data areas and wherein each data area is comprised of an equal number of fixed blocks, and wherein the logic calculates the byte displacement values in the index without physically accessing the device to determine the byte lengths of the data areas.

16. The apparatus of claim 10, further including an extent list comprised of multiple extents, wherein each extent includes one or more tracks, wherein the extents define an order of tracks and the data areas therein, and wherein the byte displacement value of a data area in a track is a total of all bytes in data areas in tracks prior in the order, wherein the logic for locating the data area in the track accesses the extent list to determine a data area in a track corresponding to a byte displacement value.

17. The apparatus of claim 10, further including a filter which identifies the structure of the tracks in the device, wherein the logic for locating the data area in the track accesses the filter to determine the structure of the tracks in the device.

18. The apparatus of claim 10, further including:
a data cursor value indicating the byte displacement for all data areas in the device;
logic for determining whether the byte displacement value for the requested address is greater than the data cursor value; and
logic for indicating that the requested address is at a location in the device which does not include data upon determining that the byte displacement value for the requested address is greater than the value in the data cursor.

19. An article of manufacture for use in extracting data from a device storing data in a first format, wherein the first format is comprised of a plurality of tracks, wherein each track has at least one data area, and wherein each data area is comprised of at least one addressable block of data, comprising the steps of:
(a) receiving a request from a host system for an address of a block of data in a second data format;
(b) determining a byte displacement value for the requested address;
(c) locating a data area in a track in the device having a byte displacement value less than the byte displacement value for the requested address;
(d) determining a byte location offset by subtracting the byte displacement value for the located data area from the byte displacement value for the requested address;
(e) determining a location in the located data area of a block of data at the byte location offset; and
(f) providing the host system with the located block of data.

20. The article of manufacture of claim 19, further comprising the step of initiating the extracting operation upon determining that the address requested by the host system is included in a block group list comprised of ranges of addresses.

21. The article of manufacture of claim 19, wherein the step of determining a byte displacement value for the requested address further causes the controller to perform the steps of:
determining a block location of the requested address from the block group list; and
calculating the byte displacement by multiplying the block location times a byte length of the blocks in the first format.

22. The article of manufacture of claim 19, further causing the controller to perform the steps of:
identifying a greatest byte displacement value in an index that is less than or equal to the byte displacement value for the requested address, wherein a data area in a track is associated with each byte displacement value in the index, and wherein the located data area in the track is the data area associated with the byte displacement value identified in the index; and
wherein the step of determining the byte location offset is determined by subtracting the byte displacement value identified in the index from the displacement value for the requested address.

23. The article of manufacture of claim 22, wherein a byte displacement value in the index for a given data area is determined by adding the byte displacement value in the index for the previous data area to the byte length of the given data area.

24. The article of manufacture of claim 23, wherein each track has an equal number of data areas and wherein each data area is comprised of an equal number of fixed blocks, and wherein the byte displacement values in the index are calculated without physically accessing the device to determine the byte lengths of the data areas.

25. The article of manufacture of claim 19, wherein the step of locating the data area in the track further includes the controller accessing an extent list comprised of multiple extents, wherein each extent includes one or more tracks, wherein the extents define an order of tracks and the data areas therein, and wherein the byte displacement value of a data area in a track is a total of all bytes in data areas in tracks prior in the order.

26. The article of manufacture of claim 19, wherein the step of locating the data area in the track further includes the controller accessing a filter which identifies the structure of the tracks.

27. The article of manufacture of claim 19, further causing the controller to perform the steps of:
determining whether the byte displacement value for the requested address is greater than a value in a data cursor, wherein the data cursor value indicates the byte displacement for all data areas in the device; and
indicating that the requested address is at a location in the device which does not include data upon determining that the byte displacement value for the requested address is greater than the value in the data cursor.

28. A memory comprised of a computer readable storage medium including a data map used by a storage controller to extract data from a device storing data in a first format, wherein the first format is comprised of a plurality of tracks, wherein each track has at least one data area, and wherein each data area is comprised of at least one addressable block of data, wherein the data map comprises:

(a) a block group list comprised of ranges of block addresses, wherein the storage controller initiates mapping operations when a host system requests a block address included in the block group list, and wherein the block group list is used to determine the byte displacement value for the requested address; and (b) an index listing byte displacement values, wherein a location of a data area in a track is associated with each byte displacement value, wherein a byte location offset is calculated by subtracting a byte displacement value listed in the index from the byte displacement value for the requested block address, wherein the storage controller locates a data area associated with the index entry of the byte displacement value subtracted from the byte displacement value for the requested block address, wherein the storage controller locates a block of data at the byte location offset within the located data area, and wherein the storage controller provides the host system with located block of data.

* * * * *

UNITED STATES PATENT AND TRADEMARK OFFICE
CERTIFICATE OF CORRECTION

PATENT NO.    : 6,041,386                                          Page 1 of 1
DATED         : March 21, 2000
INVENTOR(S)   : Bello It is certified that error appears in the above-identified patent and that said Letters Patent is hereby corrected as shown below:

<u>Column 1,</u>
Line 11, delete "BACKGROUND OF THE INVENTION" and insert
-- BACKGROUND OF THE RELATED ART --

Signed and Sealed this

Twenty-first Day of January, 2003

JAMES E. ROGAN
*Director of the United States Patent and Trademark Office*